(12) United States Patent
De'Longhi

(10) Patent No.: US 11,197,576 B2
(45) Date of Patent: Dec. 14, 2021

(54) AUTOMATIC MACHINE TO DELIVER BEVERAGES

(71) Applicant: DE'LONGHI APPLIANCES S.R.L. CON UNICO SOCIO, Treviso (IT)

(72) Inventor: Giuseppe De'Longhi, Treviso (IT)

(73) Assignee: DE'LONGHI APPLIANCES S.R.L. CON UNICO SOCIO, Treviso (IT)

( * ) Notice: Subject to any disclaimer, the term of this patent is extended or adjusted under 35 U.S.C. 154(b) by 382 days.

(21) Appl. No.: 16/305,848

(22) PCT Filed: May 30, 2017

(86) PCT No.: PCT/EP2017/063066
§ 371 (c)(1),
(2) Date: Nov. 30, 2018

(87) PCT Pub. No.: WO2017/207588
PCT Pub. Date: Dec. 7, 2017

(65) Prior Publication Data
US 2019/0320842 A1    Oct. 24, 2019

(30) Foreign Application Priority Data

May 30, 2016  (IT) ......................... 102016000055767

(51) Int. Cl.
*A47J 31/00*  (2006.01)
*A47J 31/52*  (2006.01)
(Continued)

(52) U.S. Cl.
CPC ............. *A47J 31/52* (2013.01); *A47J 31/002* (2013.01); *A47J 31/525* (2018.08);
(Continued)

(58) Field of Classification Search
CPC ........ A47J 31/002; A47J 31/52; A47J 31/521; A47J 31/525; A47J 31/5255
See application file for complete search history.

(56) References Cited

U.S. PATENT DOCUMENTS 8,607,690 B1 * 12/2013 Bresciani .............. A47J 31/542
                                                           99/281
2005/0150391 A1 *  7/2005 Schifferle ........... A47J 31/4492
                                                           99/295
(Continued)

FOREIGN PATENT DOCUMENTS

WO    WO-2020082014 A1 *  4/2020  ............... A23F 5/24

OTHER PUBLICATIONS

International Search Report and Written Opinion for PCT/EP2017/063066, dated Aug. 22, 2017.

*Primary Examiner* — Reginald Alexander
(74) *Attorney, Agent, or Firm* — Marshall, Gerstein & Borun LLP

(57) ABSTRACT

An automatic machine to deliver a beverage containing caffeine includes a water container, a possible pump, a filtering element to contain, during use, a powdered mixture, a main pipe that connects the container to the filtering element, and a heating element, associated with the container and/or with the main pipe, able to be selectively activated to heat the stream of water delivered from the container toward the filtering element in order to infuse the powdered mixture.

10 Claims, 1 Drawing Sheet

(51) Int. Cl.
*A47J 42/44* (2006.01)
*A47J 31/057* (2006.01)
*A47J 31/44* (2006.01)
*A47J 31/46* (2006.01)

(52) U.S. Cl.
CPC .......... *A47J 31/5255* (2018.08); *A47J 42/44* (2013.01); *A47J 31/057* (2013.01); *A47J 31/4407* (2013.01); *A47J 31/462* (2013.01)

(56) References Cited

U.S. PATENT DOCUMENTS

| | | |
|---|---|---|
| 2009/0084269 A1 | 4/2009 | Pozzari et al. |
| 2014/0263780 A1 | 9/2014 | Day, Jr. |
| 2015/0305551 A1 | 10/2015 | Rosati et al. |
| 2016/0143474 A1 | 5/2016 | Wessels et al. |
| 2016/0249761 A1* | 9/2016 | Llopis ................ A47J 31/3671 99/282 |

* cited by examiner

AUTOMATIC MACHINE TO DELIVER BEVERAGES

FIELD OF APPLICATION

The present invention relates to an automatic machine to deliver, for example, but not only, by infusion from a powdered mixture, hot or cold beverages, containing caffeine. For example, the beverage delivered can be coffee-based, tea-based, cocoa-based, mate-based, or based on other substances containing caffeine.

In the case at issue, without representing a limitation to the present invention, the following description is going to deal mainly with the example relating to a machine to obtain the so-called American-type coffee ("drip coffee", or "filter coffee").

BACKGROUND OF THE INVENTION

Automatic machines are known that provide to deliver, for example by infusion, a beverage containing caffeine; in particular, automatic coffee machines are known that deliver American-type coffee, generally called "drip coffee machines", or "filter coffee machines".

"Drip coffee machines" comprise, as essential elements, a water container associated with at least a heating element placed inside the container itself, or in contact therewith, or placed downstream of the container, for example in the proximity of a pipe that connects an exit of the container with a delivery element.

When the heating element is activated, the heated water is made to flow from the container, either through convective movement deriving from the heating thereof, or by means of a pumping element, through a filtering element, inside which a powdered mixture is present, to obtain an infusion.

The filtering element is usually made up of a container, having a funnel shape, inside which a filter is placed that contains the powdered mixture. Alternatively, the mixture can be loaded automatically in the filtering element by means of a device configured to grind the grain substance containing caffeine to a suitable grain size. Also a compartment or drawer containing the powdered mixture can be present which is associated with automatic loading means and/or with metering means.

In the field of these machines solutions were adopted that allow the user to control at least the heating temperature of the water, and/or to meter and possibly choke the stream of hot water that passes through the powdered mixture present in the filtering element.

Both the above-mentioned parameters, i.e. the temperature of the water and the flow rate of the stream that passes through the mixture, are directly correlated with the intensity of the aroma of the beverage, hence, with the content of soluble solids present in the beverage.

In the more advanced automatic machines, therefore, control systems were introduced that allow the user to qualitatively set the type of beverage that the machine must deliver, choosing among differentiated and available intensities.

This selection can take place, for example, by conditioning the operating cycle of the heating element, determining therefore differentiations in the temperature of water and in the overall duration of the cycle that carries out the infusion.

Alternatively, or in combination with the above, a by-pass system can be present that diverts a portion, possibly a variable portion, of the stream of hot water while not letting it pass through the mixture, but directing it straight toward the receptacle where the beverage is received. In this way the portion of diverted water is mixed to the beverage, determining its dilution.

A further possibility, which can be used in combination with the procedures previously described, can be to control the flow rate of hot water directly through adjustment means.

In this type of automatic machines the user is allowed to personalize his/her own beverage by qualitatively setting the intensity of the aroma, however without being able to have quantitative information, for example, on the content of caffeine actually present in the beverage produced.

Additionally, the automatic machines known do not allow a user to be able to choose, for example, a desired quantity of caffeine in his/her beverage, for instance to set daily, weekly or other limits, whereby this aspect would turn out to be useful for health purposes if a diet is followed, or if one wishes to set a limit to the intake of caffeine in a definite time period.

The document US 2014/263780 A describes a computer-implemented process for replicating the taste of coffee. In particular, it provides a process of generating infusion parameters that provides the selection, by a user, of a coffee-flavored beverage model based on the taste it must have. Each coffee-flavored beverage model is made to correspond to a set of parameters selected by means of a previous analysis of the ingredients on the level of caffeine, on the level of acrylamide, of the pH, or of any other chemical component that can positively or negatively affect the desired result. The user is provided with this set of parameters to replicate a beverage having the desired flavor.

Consequently, the US'780 provides a final user neither with the possibility of directly setting a limit value of caffeine contained in the beverage, nor provides any output value of the quantity of caffeine present in the final beverage, that is possibly settable, after being delivered, nor provides an output value expressed as a residual quantity of caffeine to be consumed.

The document US 2016/143474 A describes a system for the preparation of a beverage that provides a user interface to control a unit of preparation of the beverage. However, neither this document provides the delivery of an output value of the quantity of caffeine present in the beverage, or of the residual quantity of caffeine to be consumed, or the possibility to set a desired caffeine value.

The document US 2015/305551 A describes an apparatus for the delivery of a beverage configured to communicate with a mobile device and to provide, for example, information on the progress of the preparation of the beverage. This apparatus and this mobile device, however, do not provide to deliver an output value of the quantity of caffeine present in the beverage delivered, or of the residual quantity of caffeine to be consumed.

The document US 2009/0084269 A describes a display configured to allow a user to select a beverage having a pre-determined taste and in which the machine self-adjusts the operation parameters to replicate the taste of the beverage. However, this display does not provide as an output value a quantity of caffeine present in the beverage, or a residual quantity of caffeine to be consumed.

All four documents cited do not provide a direct correlation between process parameters for the delivery of a beverage and an estimation of a value of the quantity of caffeine that, by means of processing, allows to provide a user with an output value expressed as a quantity of caffeine present in the beverage, or a residual quantity of caffeine to be consumed. Additionally, none of the above-cited documents allows a user to set a desired limit value of caffeine present in the beverage, to which a setting in the parameters of delivery of the beverage itself corresponds.

An object of the present invention is to provide an automatic machine for the delivery of beverages that allows a user to obtain information on the content of caffeine of the beverage delivered.

A further object is to provide an automatic machine for the delivery of beverages that allows a user to monitor the quantity of caffeine consumed and to set time programs of personalized intake.

A further object is to provide an automatic machine for the delivery of beverages that allows a user to define and select the actual quantity of caffeine present in the beverage delivered.

To overcome the shortcomings of the prior art and to achieve these as well as other objects and advantages, the Applicant studied, experimented and realized the present invention.

SUMMARY OF THE INVENTION

The present invention is set out and characterized in the independent claims, while the dependent claims expound other features of the present invention or variants to the main idea of solution.

In accordance with the above-mentioned objects, an automatic machine to deliver a hot or cold beverage containing caffeine comprises a water container, a possible pump, a filtering element to contain, during use, a powdered mixture, a main pipe that connects the container to the filtering element, and a possible heating element, associated with the container and/or with the main pipe, able to be selectively activated to heat the stream of water delivered from the container toward the filtering element in order to infuse the powdered mixture.

The automatic machine can further comprise at least a grinding system for beans or grains, and/or at least a system for metering/weighing the quantity of mixture fed.

The automatic machine comprises also at least an adjustment element to adjust the flow rate of the infusion water, and/or at least an element to divert/choke the flow rate of the water, and/or at least an element for grain size selection/metering, able to be selectively activated by a user to set functioning parameters of the automatic machine in relation to the obtainment of a beverage having differentiated features under an organoleptic point of view.

According to an aspect of the present invention, the automatic machine comprises a processing and control unit configured to determine a bi-univocal association between the quantity of caffeine present in the final beverage obtained and the actual flow rate of water and/or the temperature of the infusion water and/or the quantity of water diverted, and not made to pass through the filtering element, and/or the grain size determined by grinding and/or the quantity fed of the ground powder.

According to a formulation of the invention, the automatic machine further comprises display means to display to the user an estimate of the content of caffeine present in the beverage obtained in relation to the settings of the machine determined by the user and in relation to the mixture of powder used and by the origin of coffee.

Thanks to this bi-univocal association, and to this possible display, advantageously, a user can know the estimate of the content of caffeine present in his/her beverage at the time of delivery.

In combination therewith, or alternatively, he/she can know, by difference, the quantity of caffeine that still remains to be consumed based, for instance, on a daily, weekly, or monthly diet program, in relation to the set parameters of selection of the type of beverage to be delivered.

Alternatively, and in forms of a variant of the present invention, the user can directly set a quantity of caffeine he/she wants to take, determining, as a consequence, on the part of the processing and control unit, the setting of the functioning parameters of the machine correlated to that quantity of caffeine.

Also a method to deliver a hot or cold beverage that provides to determine the content of caffeine in said beverage or the residual content of caffeine to be consumed by the user constitutes an object of the present invention.

BRIEF DESCRIPTION OF THE DRAWINGS

These and other features of the present invention will be clear from the following description of forms of embodiment, provided by way of a non-limiting example, with reference to the annexed drawings, in which.

To facilitate understanding, identical reference numbers were used, where possible, to identify identical common elements in the figures. It shall be understood that elements and features of a form of embodiment can be suitably incorporated in other forms of embodiment without any further specifications.

DETAILED DESCRIPTION

Figure 1:
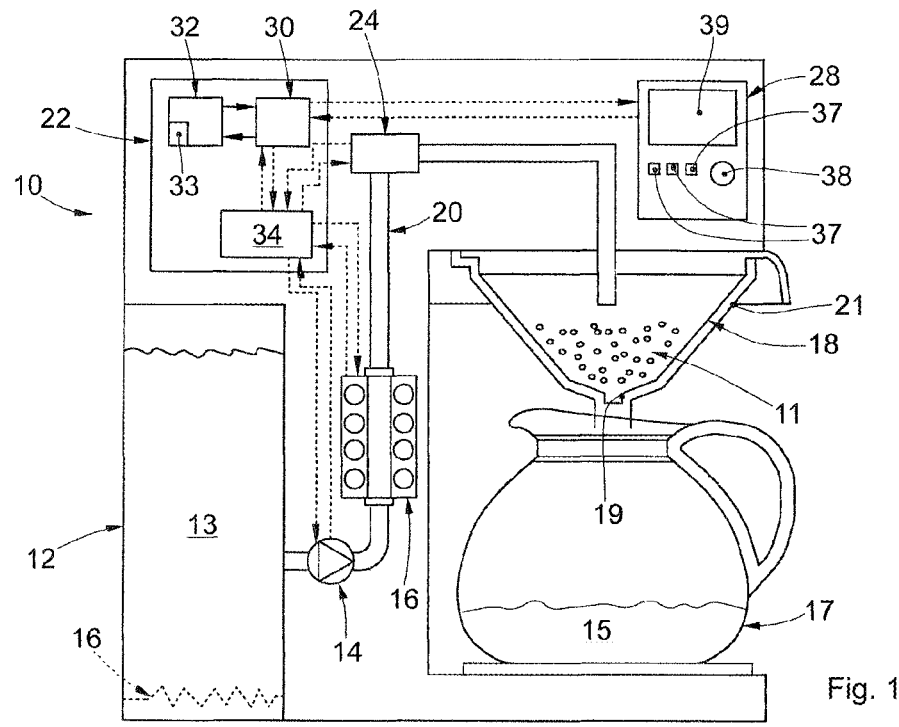
FIG. 1 is a schematic diagram of an automatic machine to deliver beverages in a form of embodiment.

Forms of embodiment described herein with reference to FIG. 1 relate to an automatic machine 10 to deliver a hot or cold beverage 15 containing caffeine starting from a powdered mixture 11 by means of infusion or mixing of the same with water 13.

Without constituting a limitation to the present invention, the automatic machine 10 is used for the delivery of coffee of the type called "drip coffee", or "filter coffee", i.e. the so-called American-type coffee, obtained through infusion of a mixture 11 of powdered coffee.

The mixture 11 can have a different consistency, for instance it can be present in the form of grains, flakes, of a various and differentiated grain size, deriving from coffee beans, or tea leaves, or other substances containing caffeine.

The automatic machine 10 comprises a container 12, inside which a definite quantity of water 13 is present, which is usually at room temperature, and a heating element 16.

The automatic machine 10 can possibly comprise a pump 14 placed downstream of the container 12.

The automatic machine 10 also comprises a filtering element 18 that contains inside it, during use, the powdered mixture 11. When water 13, heated to an infusion temperature, passes through the mixture 11 contained in the filtering element 18, there occurs the delivery of the beverage 15 directly into a receptacle 17.

The filtering element 18 can be made in a metallic material for its re-use in several cycles of delivery of the beverage 15, or in a plastic material resistant to infusion temperatures, or in a cellulosic material for a single use.

According to a form of embodiment, the filtering element 18, advantageously, can be shaped as a funnel and be placed inside a support element, or filter-holder, 21, made for example from the outer frame of the automatic machine 10, or arranged inside it.

Said containing element 21 has an exit hole 19 that can be positioned in a position directly above the opening of the receptacle 17 and from which the beverage 15 coming from the filtering element 18 is extracted.

The exit hole 19 can be adjusted to have a different cross section depending on the infusion requirements of the mixture 11, or to adjust the speed of the infusion water 13.

The container 12 and the filtering element 18 are hydraulically connected by means of a main pipe 20.

In a form of embodiment, illustrated by way of example in FIG. 1, the heating element 16 can be installed between the pump 14 and the filtering element 18 in cooperation with a portion of the main pipe 20 in order to heat the water 13 to the infusion temperature, or, alternatively, be arranged inside the container 12.

Figure 2:
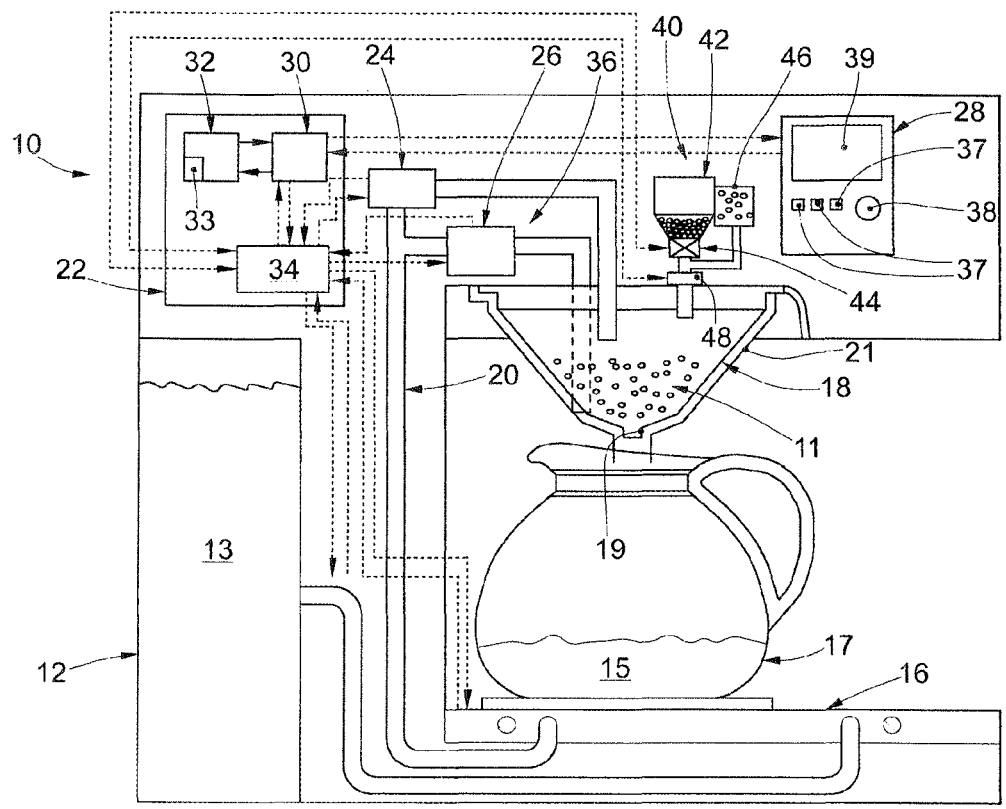
FIG. 2 is a schematic diagram of an automatic machine according to a further form of embodiment.

In a further form of embodiment illustrated by way of example in FIG. 2, the heating element 16 can be installed underneath the receptacle 17, inside its support base. In this case, the pump 14 can be unnecessary, and handling of water is carried out by exploiting the convective motions deriving from its heating.

The heating element 16 can be, for instance, an electrical resistance, or an electric induction element, or an infrared heating element, or any other heat source suitable to keep appropriate infusion temperatures that are necessary to allow for an optimum extraction of the beverage 15.

In forms of embodiment of the invention, the automatic machine 10 can, additionally, comprise an adjustment element of the flow rate 24 of infusion water and/or an element 26 to divert/choke water.

According to a form of embodiment illustrated by way of example in FIG. 2, the automatic machine 10 can further comprise a grinding device 40 of the substance containing caffeine, for example coffee beans.

The grinding device 40 comprises, in the solution illustrated, a hopper 42 that feeds a grinder element 44 to obtain the mixture 11 based on a definite grain size settable by the user, automatically adjustable, or predefined.

The grinder element 44 is associated with a device 48 for metering the quantity of mixture 11 to be directly delivered in the filtering element 18, a quantity that can be settable manually, adjustable automatically, or predefined.

According to a further form of embodiment, also a compartment is present for containing the powdered mixture 46, selectable as an alternative to grain feeding, which is also connected to the metering device 48.

According to an aspect of the present invention, the automatic machine 10 comprises a processing and control unit 22 configured to calculate and estimate, through a bi-univocal association, the quantity of caffeine present in the beverage 15 delivered, or the residual quantity of caffeine to be consumed starting from an effective value of the flow rate of infusion water and/or of the infusion temperature and/or of the quantity of water diverted with respect to the passage through the filtering element 18 and/or the quantity and/or the grain size of the mixture present in the filtering element 18.

In particular, the processing and control unit 22 is configured, starting from pre-memorized data and/or data inserted on each occasion, to carry out a direct correlation between some functioning parameters of the automatic machine 10 and the estimated value of caffeine resulting in the beverage 15 delivered. The afore-mentioned functioning parameters can be one or more between the temperature of the water given a definite cycle of operation of the heating element 16, the portion of water diverted by the diversion/choking element 26, the water flow rate determined by the adjustment element 24, the grain size and/or the quantity of the mixture 11 determined by the grinding element 40 and/or by the metering element 48.

In this manner, for each setting of the automatic machine 10 determined by the user, or pre-set on the basis of pre-memorized parameters, the processing and control unit 22 is configured to generate, and possibly display, a corresponding estimated value of the caffeine present in the beverage 15.

The processing and control unit 22 comprises a user interface 28 configured to allow a user to insert, or set, one or more input values and to possibly display at least one output value generated by a processor device 30.

In a form of embodiment illustrated in the FIGS. 1 and 2, the user interface 28 can be installed in the automatic machine 10 and, for instance, be provided with buttons 37, knobs 38 or other, to set at least part of the input values, with display means 39, for example a monitor, to facilitate the display, and with possible warning lights.

In a further form of embodiment not illustrated in the figures, the user interface 28 can be a remote device, for example a smartphone, a tablet, a remote control, or similar, communicating wirelessly with the automatic machine 10 by means of Wi-Fi or Bluetooth® or Zig-Bee protocol, or an infrared communication of the IrDa type or other.

Input values can mean possible setting values to obtain a beverage 15 according to the user preference at the same ratio between quantity of water and quantity of powder. For example, the input values can be organoleptic qualitative values, for instance of intensity of aroma, that the beverage 15 must have, either bitter or light, and/or quantitative values that express the infusion temperature of water, or the quantity of beverage 15 to be delivered.

According to a form of embodiment, the output value can be expressed as the quantity of caffeine present in the beverage 15, expressed for instance in milligrams per liter, or in another suitable unit of measurement.

According to a form of embodiment, the input value can be expressed as the quantity of caffeine that one wishes to have in the beverage 15, while the output value can be expressed as the residual quantity of caffeine that a user can still consume after the delivery of the beverage 15. In this case, a database 33 can contain pre-set data relating to a planning of the consumptions personalized by a user and that provides a chronological tracking, for example an hourly, daily, weekly or monthly tracking of caffeine consumption.

Advantageously, a user can monitor the caffeine consumption based on a diet or to limit the consumption of beverages containing caffeine.

The processing and control unit 22 comprises also a memorization device 32 having in its memory the functioning parameters of the automatic machine 10 and/or specific parameters of the mixture 11.

The specific parameters of the mixture 11 can comprise the grain size and/or the caffeine content and/or the type of processing that the raw material has undergone, for example, in case of coffee, the type of roasting to which the beans were subjected and/or parameters that can be associated with the specific supplier, quality, type or other, of the substance containing caffeine and/or connected to the type of "blend" of the supplier to facilitate identification within the database 33.

The specific parameters of the mixture 11 can be standard parameters that cannot be modified, or parameters that can be modified based on the type of mixture 11 used to deliver the beverage 15.

In accordance with a form of embodiment, the functioning parameters can be determined by graphical control charts, for example those known with the denomination Control Coffee Chart, which allow to deduce the characteristics of the coffee to be delivered thanks to the correlation between the substances extracted from the mixture 11 through infusion water 13 and the dry residual concentrate present in the beverage 15 to obtain a certain intensity of the aroma, through the setting of definite functioning parameters.

The processor device 30, comprised in the processing and control unit 22, is configured to process input values and the functioning parameters and/or the specific parameters of the mixture 11, memorized in the database 33, to generate process signals and to calculate and possibly display the output value.

For example, a definite input value, or combination of input values, corresponds to definite combinations of specific parameters of the mixture 11 and of functioning parameters that are used by the processor device 30 to send out a plurality of process signals.

To process the process signals and the output value, the processor device 30 is based on operating instructions that are pre-memorized in the memorization device 32.

The processing and control unit 22 comprises a controller device 34 configured to receive the process signals and to transmit them to the pump 14 and/or to the heating element 16 and/or to the element 24 to adjust the flow rate and/or to the element to adjust the exit hole 19 and/or to the possible diversion/choking element 26 and/or to the grinding device 40 and/or to the metering device 48.

The controller device 34 receives signals from sensors associated to the pump 14 and/or to the heating element 16 and/or to the element 24 to adjust the flow rate and/or to the element to adjust the exit hole 19 and/or to the possible diversion/choking element 26 and/or to the grinding device 40 and/or to the metering device 48.

According to a form of embodiment illustrated by way of example in FIG. 1, the element 24 to adjust the flow rate is installed at the main pipe 20 downstream of the heating element 16 and allows to adjust also the speed of the infusion water 13 passing through the mixture 11 for the extraction of caffeine.

The cooperation between the heating element 16 and the element 24 to adjust the flow rate allows to modulate the temperature and the flow rate of the infusion water 13 that passes through the mixture 11.

The heating element 16 is configured to heat water 13 to the infusion temperature according to a predetermined operating cycle that can determine its activation and switching off.

According to a form of embodiment illustrated by way of example in FIG. 2, the automatic machine 10 comprises a diversion pipe 36 connected to the main pipe 20 and configured to at least partly divert the infusion water 13 from the filtering element 18.

The diversion pipe 36 can be installed outside the containing element 21, or can have its exit nozzle in the containing element 21 outside the filtering element 18.

The diversion/choking element 26 is associated to the main pipe 20 and to the diversion pipe 36 to determine the flow rate of water 13 to be diverted from the filtering element 18.

The diversion/choking element 26 can be, for instance, a three-way valve.

According to a form of embodiment, the diversion/choking element 26 is placed downstream of the heating element 26.

According to a further form of embodiment, the diversion/choking element 26 is installed upstream of the element 24 to adjust the flow rate, if it is possibly provided in combination therewith.

It is evident that modifications and/or additions of parts can be made to the automatic machine 10 described heretofore, without, for this, departing from the scope of the present invention.

It is also clear that, even though the present invention was described with reference to some specific examples, a person skilled in the art will certainly be able to achieve many other equivalent forms of automatic machine 10, having the characteristics set out in the claims and, hence, all of them falling within the scope of protection defined by them.

The invention claimed is:

1. An automatic machine to deliver a beverage containing caffeine, comprising: a water container, a pump, a filtering element to contain, during use, a powdered mixture, a main pipe that connects the container to the filtering element, and a heating element, the heating element being associated with the container and/or with the main pipe and able to be selectively activated to heat the stream of water delivered from the container toward the filtering element in order to infuse the powdered mixture, said automatic machine also comprising an adjustment element to adjust a flow rate of the water, and/or an element to divert/choke the flow rate of the water, both of the adjustment and divert/choke elements able to be selectively activated by a user, and/or a grinding device and/or a metering device, and further comprising a processing and control unit configured to calculate and estimate a quantity of caffeine present in the beverage delivered determining a bi-univocal association between an estimated quantity of caffeine present in a final beverage obtained and one or more of parameters chosen at least between an actual flow rate of water, a temperature of the water, a quantity of water diverted, a grain size and/or a quantity of the powdered mixture and to carry out a direct correlation between functioning parameters of the automatic machine and the estimated value of caffeine resulting in the beverage delivered starting from pre-memorized data and/or data inserted on an occasion, wherein for a setting of the automatic machine determined by the user, or pre-set on the basis of pre-memorized parameters, the processing and control unit is configured to generate a corresponding estimated value of the caffeine present in the beverage and the automatic machine, and including display means to display said estimated quantity of caffeine present in the final beverage.

2. The automatic machine as in claim 1, wherein said processing and control unit comprises a user interface configured to insert, or set, one or more input values and to possibly display at least one output value generated by a processor device.

3. The automatic machine as in claim 2, wherein said at least one output value is expressed as the quantity of caffeine present in said beverage.

4. The automatic machine as in claim 2, wherein said at least one output value is expressed as a residual quantity of caffeine to be consumed by a user.

5. The automatic machine as in claim 2, wherein said user interface is installed in said automatic machine.

6. The automatic machine as in claim 2, wherein said user interface is a remote device, communicating wirelessly with said automatic machine by means of Wi-Fi, Bluetooth® or Zig-Bee protocol, or an infrared communication of the IrDa type.

7. The automatic machine as in claim 1, wherein said processing and control unit comprises a memorization device having in its memory functioning parameters of said automatic machine and/or specific parameters of the mixture.

8. The automatic machine as in claim 1, wherein said processing and control unit comprises a controller device configured to receive process signals and to transmit said process signals to said pump and/or to said heating element and/or to said element to adjust the flow rate and/or to an element to adjust an exit hole and/or to the divert/choke said element and/or to said grinding device and/or to said metering device.

9. The automatic machine as in claim 1, comprising a diversion pipe associated with said diversion/choking element, connected to said main pipe and configured to at least partly divert the infusion water from said filtering element.

10. A method to deliver a beverage containing caffeine in an automatic machine, wherein the automatic machine comprises a water container, a pump, a filtering element to contain, during use, a powdered mixture, a main pipe that connects the container to the filtering element, and a heating element, associated with the container and/or with the main pipe, the heating device able to be selectively activated to heat a stream of water delivered from the water container toward the filtering element in order to infuse the powdered mixture, said automatic machine also comprising at least an adjustment element to adjust a flow rate of the water, and/or an element to divert/choke the flow rate of the water, both the adjustment element and the divert/choke element able to be selectively activated by a user, and/or a grinding device and/or a metering device, and further comprising a processing and control unit configured to determine a bi-univocal association between an estimated quantity of caffeine present in a final beverage obtained and one or more of parameters chosen at least between an actual flow rate of water, a temperature of the water, a quantity of water diverted, a grain size and/or a quantity of the powdered mixture;

and further comprising:
acquiring, by a processing and control unit, one or more input values inserted by means of a user interface, wherein said input values are one or more of: a qualitative value of the intensity of the aroma that the beverage must have, an infusion temperature of the water, a quantity of beverage to be delivered, a desired quantity of caffeine to be had in the beverage;

calculating, by said processing and control unit, an output value that corresponds bi-univocally to said input value, wherein said output value is an estimated quantity of caffeine present in the beverage, or a quantity of residual caffeine to be consumed by a user;

processing, by said processing and control unit, one or more functioning parameters of said automatic machine on the basis of said input and/or output values, wherein said functioning parameters are one or more of: the functioning cycle of the heating element and/or the portion of water diverted by the diversion/choking element, and/or the flow rate of the water determined by the adjustment element, and/or the grain size, and/or the quantity of the mixture to carry out a direct correlation between said functioning parameters of the automatic machine and the estimated value of caffeine resulting in the beverage delivered starting from pre-memorized data and/or data inserted on each occasion, and generating, for each setting of the automatic machine determined by the user, or pre-set on the basis of pre-memorized parameters, a corresponding estimated value of the caffeine present in the beverage and displaying it on display means.

* * * * *